UNITED STATES PATENT OFFICE.

JÉROME LOISELET, OF PARIS, FRANCE, ASSIGNOR TO SOCIÉTÉ DES PRODUITS AMYLACÉS, OF PARIS, FRANCE.

PROCESS OF MANUFACTURING STARCH.

SPECIFICATION forming part of Letters Patent No. 702,571, dated June 17, 1902.

Application filed February 26, 1902. Serial No. 95,755. (No specimens.)

*To all whom it may concern:*

Be it known that I, JÉROME LOISELET, a citizen of the French Republic, residing at Paris, France, (having post-office address 123 Boulevard de la Gare, in said city,) have invented certain new and useful Improvements in Processes of Manufacturing Starch, of which the following is a specification.

The processes hitherto used for the manufacture of starch from rice, maize, and other substance (whether whole or broken) are generally based on a series of operations comprising a steeping or several steepings of the rice, the maize, or other substance in solutions of caustic soda, after which the substance thus treated is subjected to grinding or crushing and decantation followed by repeated washings, siftings, and deposition of the starch in closed vats.

Processes based on a series of successive steepings and washings have the serious disadvantage of necessitating large plant, costly labor, and great quantities of water.

The object of this invention is to provide a process which considerably reduces the plant, labor, and quantity of water required and permits of the starch being purified on inclined planes, the product having greater whiteness than hitherto.

The process comprises the following operations to which the rice is subjected. The rice, maize, or other substance is steeped in a solution or solutions of sulfurous acid and is then washed several times in pure water and is afterward ground in contact with a jet of pure water. It is then sifted, and the starch is deposited and purified on inclined planes and then collected and diluted. The diluted starch is then subjected to electrolysis in a suitable manner and then passed through very fine sieves receiving the organic precipitate formed by the action of the current. One of the results of the electrolysis is to prevent the fermentation in the drying-kiln so frequent in other processes. After electrolyzing the product is again sifted, and then the starch is deposited and purified on inclined planes and afterward collected and so diluted that it has the consistency of cream, whereupon it is introduced into small vats and is dried and stirred.

Having now particularly described and ascertained the nature of my said invention and in what manner the same is to be performed, I declare that what I claim is—

1. An improvement in the manufacture of starch which consists in subjecting the material from which the starch is derived to a suitable acid solution, washing and grinding the mass, purifying the ground mass, then diluting the purified mass, electrolyzing the diluted mass, removing the organic precipitate from the product, purifying the product, diluting the product, and then suitably drying the diluted product, substantially as set forth and for the purpose specified.

2. An improvement in the manufacture of starch which consists in subjecting the material from which the starch is derived to a sulfurous-acid solution, washing and grinding the mass, purifying the ground mass, then diluting the purified mass, electrolyzing the diluted mass, removing the organic precipitate from the product, purifying the product, diluting the product, and then suitably drying the diluted product, substantially as set forth and for the purpose specified.

3. An improvement in the manufacture of starch which consists in subjecting the material from which the starch is derived to a sulfurous-acid solution, washing and then grinding the mass while in contact with a jet of pure water, purifying the ground mass, diluting the purified mass, electrolyzing the diluted mass, removing the organic precipitate from the product, purifying the product, diluting the product, and then suitably drying the diluted product, substantially as set forth and for the purpose specified.

4. An improvement in the manufacture of starch consisting in subjecting the material from which the starch is derived to a suitable acid solution, washing and grinding the mass, purifying the ground mass on inclined planes, diluting the purified mass, electrolyzing the diluted mass, removing the organic precipitate from the product, purifying the product on inclined planes, diluting the product, and then suitably drying the diluted product, substantially as set forth and for the purpose specified.

5. An improvement in the manufacture of starch consisting in subjecting the material from which the starch is derived to a suitable acid solution, washing and grinding the mass, purifying the ground mass on inclined planes, diluting the purified mass, electrolyzing the diluted mass, removing the organic precipitate from the product, purifying the product on inclined planes, diluting the product to the consistency of cream, and then suitably drying the diluted product, substantially as set forth and for the purpose specified.

In testimony whereof I have hereunto set my hand in presence of two subscribing witnesses.

JÉROME LOISELET.

Witnesses:
EDWARD P. MACLEAN,
EMILE KLOTZ.